United States Patent [19]
Witzig

[11] 3,914,440
[45] Oct. 21, 1975

[54] STABILIZED FROZEN THICK SHAKE
[75] Inventor: Ralph P. Witzig, New City, N.Y.
[73] Assignee: General Foods Corporation, White Plains, N.Y.
[22] Filed: Feb. 14, 1973
[21] Appl. No.: 332,474

[52] U.S. Cl. ............... 426/130; 426/164; 426/393
[51] Int. Cl.² ........................................ A23G 9/04
[58] Field of Search .......... 426/164, 130, 172, 393, 426/359, 524

[56] References Cited
UNITED STATES PATENTS

| | | | |
|---|---|---|---|
| 2,975,064 | 3/1961 | Sperry | 426/164 |
| 3,385,714 | 5/1968 | Smith | 426/131 |
| 3,479,187 | 11/1969 | Arbuckle | 426/359 |
| 3,694,236 | 9/1972 | Edlin | 426/372 |
| 3,726,690 | 4/1973 | Schuppner | 426/359 |
| 3,784,715 | 1/1974 | Arden | 426/172 |

OTHER PUBLICATIONS

Kelco, Keltrol Kelzan Xanthan Gum a Natural Bio polysaccharide for Scientific Water Control, July 1972.

Primary Examiner—Jeanette M. Hunter
Attorney, Agent, or Firm—Bruno P. Struzzi; Thomas V. Sullivan; Michael J. Quillinan

[57] ABSTRACT

A stabilized frozen thick shake comprising an emulsion of sugar and fat which has been homogenized at a pressure sufficient to discretely disperse the fat globules therein and wherein the aqueous phase that has been partially crystallized as discrete water ice particles is stabilized by xanthan gum, a soluble alginate and a polyvalent cation permitting product to be stored at 0°–40°F while resisting separation under abusive temperature conditions.

9 Claims, No Drawings

STABILIZED FROZEN THICK SHAKE

INTRODUCTION

This invention relates to improvements in formulation and processing of frozen aqueous thick shakes which are characteristically possessed of ice particles and have a sufficient plasticity to permit the emulsion to be spooned or otherwise manipulated for mixing with milk or other like aqueous medium preparatory to stirring to form a shake of cold impact.

BACKGROUND OF THE INVENTION

The prior art of making a shake of the aforestated type customarily has involved the institutional sale at a stand or parlor of a composition wherein water in a mixture of sugar, fat and milk is partially crystallized and which is served for immediate consumption to provide a refreshingly smooth flavorful cooling organoleptic impact. The packaging of such a procuct for frozen distribution at retail has eluded prior art workers prior to this invention. Whereas compositions capable of being mixed with a like quantity of milk to provide a thick shake texture having a distinctive ice-containing texture and cold impact had been marketed, such products tended to separate at cyclical storage temperature of 0°–40°F which are to be expected in the course of wholesale and retail distribution and storage into an unfunctional syrup collecting at the package bottom. The use of conventional gum stabilizers such as methyl cellulose, carragenan, dextrose and guar failed to eliminate the problem of product separation, particularly in those instances where the product was exposed at above, say, 25°F for sustained inventory periods.

STATEMENT OF THE INVENTION

In accordance with the present invention, a stabilized shake of the aforestated type is rendered viable by the use in combination of xanthan gum, a soluble alginate and a polyvalent cation source which is operative to complex with the algin to form a water insoluble alginate. Shakes so stabilized have been found to result in a product with improved texture, flavor and resistance to separation under abusive frozen food warehouse and distribution temperature conditions. Whereas milk soluble algins of the type used in the ice cream industry (sodium, potassium or ammonium alginate) result in a slight improvement of texture and resistance to phase separation and whereas use of xanthan gum alone results in an icy texture and slight improvement also in resistance to separation, the use in combination of these two gelling agents under conditions operative to cause the algin to complex to an insoluble form imparts an optimum texture and resistance to phase separation under abusive storage conditions. It is believed that the formation of the insoluble alginate gel coupled with the stabilizing effect of the xanthan gum serves to preserve the aqueous phase in relationship to the emulsified fat during those periods when elevated temperatures that might otherwise occasion phase separation are experienced.

DETAILED DESCRIPTION OF THE INVENTION

The formulation and processing conditions of this invention are intended to avoid those abusive storage temperatures, generally tested at 10°F, where product phase separation occurs and where a clear liquid migrates towards the bottom of a container which liquid is composed mainly of sweeteners, freezing point depressants and flavors.

In formulating the shake which will be understood to those skilled in the art as consisting of a mixture of discrete water ice crystals in a fat phase and a sweetening sugar phase that has been subjected to some degree of agitation and consequent overrun through air inclusion, a pasteurized batch upon suitable mixing to be hereinafter described and containing the xanthan gum-alginate stabilizer will be charged to a homogenizer at a pressure in excess of 3000 psig and thereby reduce fat particles to as discrete a size as practical and most preferably to one having a high population of globules whose numerical majority is less than 50 microns. Among the major characterizing ingredients of the stabilizing composition are a corn syrup solids digest (enzymic) having a high dextrose equivalency, say, between 20 and 60, sucrose and a fat having preferably a sharp plastic range at about body temperature. These major characterizing agents will have added thereto other functional ingredients such as sorbitol and glycerol which further impart spoonability and a plasticizing property to the composition while also serving to significantly depress the product freezing point as ultimately packaged. The other characterizing ingredients of the composition will be the flavoring and coloring.

Included in the water soluble phase of the composition will be an amount of known sequestering salt, e.g., a monovalent cation salt such as an ammonium, potassium or sodium salt of an organic or inorganic acid like in sodium phosphate, sodium citrate also operative to control gelling alginate under the processing conditions used to prepare the shake; preferred sequestering salts are molecularly dehydrated phosphates like sodium hexametaphosphate and tetrasodium pyrophosphate. Sodium alginate will be greatly aided in its functional effect by a source of polyvalent cations such as nonfat dry milk solids or sodium caseinates which provide a nutritious protein source and contribute to and support emulsification of the aqueous phase; alternatives to the dry skim milk solids and sodium caseinate will be the polyvalent salts or acid salts of organic or inorganic acids such as calcium gluconate, calcium tatrate, etc.

The fat preferably will be a hydrogenated non-lauric vegetable fat and typically one having a melting point of body temperature, say, 100°F plus or minus 5°, the solids index of the fat having a sharp plastic range when it achieves this temperature, say, at above 90°F and thus the solids index being rapidly reduced and providing a cooling effect on mouth feel when the product is eventually consumed.

In accordance with its more preferred and specific aspects, xanthan gum will be employed at a level of approximately 0.1% of the total composition and generally will provide the functionality and use benefits of the invention with increasing levels from about 0.025% up to 0.2%, although as one increases the xanthan use level above 0.1% functional use benefits therefrom will not be as great or as the upper limit is exceeded will not be realized to any significant extent. Likewise, the alginate will be used preferably at a level of about 0.3% and broadly within a level of 0.05–0.5%; at levels above 0.5% no increased benefits accruing from conjunctive use of alginates with xanthan has been found; on the other hand, at use levels below 0.05% functionality of the algin in enhancing stabilization of the xanthan is not sufficiently obtained to realize the benefits of using both gums in combination.

The shake system will preferably have a neutral pH in the order of 5.0–7.0 although lower pH's may be practical where certain fruit flavored shakes are formulated and where algin gum functionality is fostered. However, optimal organoleptic acceptability for most formulations and gum functionality for the xanthan-algin combinations is usually obtained in pH's of the aforesaid nuetral ranges.

The weight percent of the sugar phase of the total composition is commonly in the range between 15 and 25%, solids of the fat base being 5% and 25% by weight of the total composition. At sugar levels below 15% sufficient sweetness and functionality for providing freezing point depression are not obtained, the term sugar in this context being understood to apply both to mono- and polysaccharides and alcohol equivalents thereof; e.g. sorbitol, mannitol and mixtures.

In a typical processing operation the following formulation is employed:

| Ingredients | Parts by Weight |
| --- | --- |
| Water | 55.8 |
| Corn Syrup | 23.8 |
| Wecotop A (plastic fat) | 8.9 |
| Sugar | 4.6 |
| Nonfat Dry Milk | 2.0 |
| Sorbitol | 2.0 |
| Glycerol | 2.0 |
| Xanthan Gum | 0.1 |
| Salt ($N_aCl$) | 0.2 |
| Tween Mos 280 VS | 0.1 |
| Sodium Alginate | 0.351 |
| Tetrasodium Pyrophosphate | 0.03 |
| Flavor | 0.3 |
| Color | 0.003 |

Water at 140°–150°F is added to a mix tank. Enzymatically converted corn syrup (33 DE) is added to the tank under continuous agitation whereafter fat maintained at 135°–145°F in the liquid states is added followed by addition of the surfactant (Tween) emulsifier (mono- and diglycerides of an edible fat) and a polysorbate. With continued agitation freezing point depressents sorbitol and glycerol are added thereafter. At this point the mixture is an essentially emulsified mixture of fat and sugars in solution.

Thereafter the functional ingredients of this invention are added as part of a dry mix, to wit, the sodium alginate and the xanthan gum together with sugar, nonfat dry milk solids, phosphate, sodium chloride, flavors and colors. These ingredients are mixed for a minimum period of five minutes or until the ingredients are all dispersed whereupon they are at a temperature of at least 140°F and not above 180°F. At this point the liquid suspension is pasteurized under commercial sterilizing or pasteurizing conditions by being subjected to an elevated temperature of at least 160°F for a period in excess of ten minutes and ranging broadly between ten and twenty minutes depending upon the elevated pasteurizing temperature.

At this point the batch is immediately charged to a twostage Manton Gaulin homogenizer operating at a homogenization pressure in excess of 3000 psig and typically in the neighborhood of 4000 psig in the first stage and 500 psig in the second stage, thereby causing an emulsification of the fat globules to an extent such that the majority thereof may be viewed by spectral photometric means known to skilled art workers as less than 25 microns and a median particle size in the order of 10 microns.

The homogenized emulsion formulation is immediately charged to a plate cooler wherein it is cooled to 35°–50°F, preferably 40°–45°F preparatory to being charged to a scrape surface heat exchanger wherein two conditions are achieved:

a. the water in the emulsion is partially crystallized to produce discrete water ice crystals in an amount (5–20%) sufficient to provide organoleptic cold impact in the final product (15%); and b. the material is caused to undergo a degree of overrun achieved by air injection into the scrape surface heat exchanger such that the product has an overrun between 5% and 25% and typically 10–15% of the original volume charged to the heat exchanger.

Generally, the formulation will typically have a freezing point ranging between 18° and 22°F, the optimal target being 19°–21°F. It will be recognized by skilled workers that inclusion of various freezing point depressants and formulation changes will be operative to achieve this target. The emulsion and "shake" produced by the heat exchange operation described herein will then be charged at a temperature below 20°F to a filler wherein the stabilized slush-shake system will be packaged and eventually frozen say in a blast freezer which freezes the packaged composition to a center temperature of 0°F or below.

The product so packaged can be distributed at wholesale and retail and will be uniquely characterized by its resistence to separation and the abusive storage temperatures which are commonly experienced and may range anywhere from 0° to 40°, the more common median abuse temperature encountered being 10°–15°F for frozen distribution. Of course, a product that is cycled for a protracted period of time at 40°F will not have the functional ice characteristics of this invention and it is not intended to imply hereby that a product that is stored at above the freezing point thereof indefinitely will retain functionality as such and undergo no phase separation. However, what is represented hereby is that a product can withstand for reasonably limited periods a thermal cycling under warehouse storage conditions which will not occasion the phase separation which has heretofore characaterized such shake systems when stored.

What is claimed is:

1. The process of preparing a stabilized frozen aqueous thick shake comprising an emulsion of sugar and fat having discrete water ice crystals therein which comprises formulating an aqueous mixture of at least 15% sugar, fat, xanthan gum and algin, pasteurizing the formulation, incorporating therein a polyvalent cation source operative to form a water insoluble alginate for complexing and for stabilizing the shake in combination with the xanthan gum, homogenizing the formulation at a pressure above 3000 psig to produce an emulsion having dispersed fat globules where numerical majority is less than 50 microns, cooling to crystallize a portion of the aqueous phase in the composition after homogenization to produce a quality of discrete water ice crystals and injecting air therein to produce an overrun between 5–25%, charging the composition at below 20°F, to a package filler, packaging the composition, and freezing and cooling the packaged composition to a center temperature below 0°F.

2. The process of claim 1 wherein the composition has a freezing point as formulated prior to partial crystallization of 18°–22°F. and wherein the sugar content is 15% – 25% and the fat content is 5% – 25%.

3. The process of claim 1 wherein the product as crystallized after generation of overrun therein and prior to cooling to below its freezing point has 5–20% of its total weight in the form of said discrete water ice crystals.

4. The process of claim 3 wherein the composition has an overrun between 5% and 25% of the original volume charged to the crystallizer.

5. The process of claim 4 wherein the product has an overrun of 10–15%.

6. The process of claim 2 wherein the homogenized emulsion is cooled to a temperature below 50°F but above its freezing point prior to partial crystallization.

7. The process of claim 1 wherein the fat is a plasticized fat having a sharp melting point at 95°–105°F and wherein the fat particles are less than 25 microns in their major number.

8. The process of claim 1 wherein the xanthan gum is employed at a level of 0.02–0.25% and wherein the algin is employed at a level of 0.05–0.5%.

9. The packaged composition produced by the process of claim 1.

* * * * *